Aug. 5, 1924.
E. ABBOTT
1,503,621
VEHICLE HEADLIGHT CONSTRUCTION
Filed Oct. 20, 1922
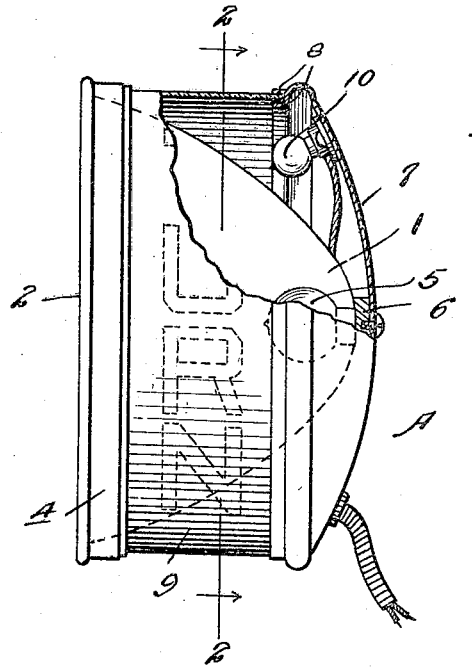
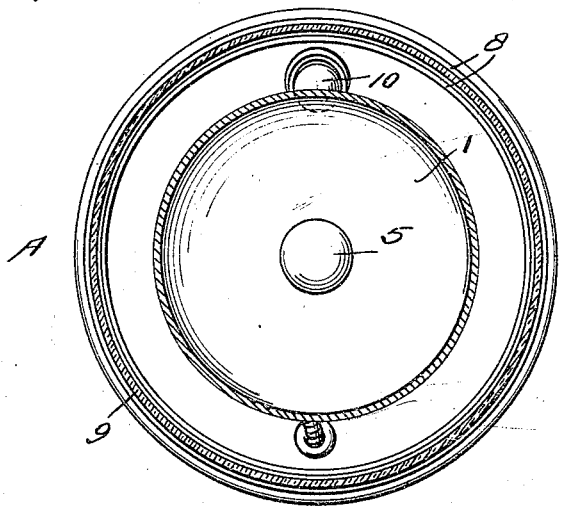
WITNESSES
Earl Abbott,
INVENTOR.
BY
ATTORNEYS.

Patented Aug. 5, 1924.

1,503,621

UNITED STATES PATENT OFFICE.

EARL ABBOTT, OF FORT THOMAS, KENTUCKY.

VEHICLE HEADLIGHT CONSTRUCTION.

Application filed October 20, 1922. Serial No. 595,745.

*To all whom it may concern:*

Be it known that I, EARL ABBOTT, a citizen of the United States, residing at Fort Thomas, in the county of Campbell and State of Kentucky, have invented certain new and useful Improvements in Vehicle Headlight Constructions, of which the following is a specification.

An object of the invention resides in the provision of a lamp construction for vehicles wherein the lamp casing is provided with a transparent annular portion adapted, upon illumination within the casing, between the parabolic reflector therein and the casing, to project an annular stream of light downwardly from the casing, and adapted for use as a signal or the like, in addition to the usual lamp being provided in the parabolic reflector for projecting a beam of light forwardly from the lamp casing.

With these general objects in view, and others that will appear as the nature of the invention is better understood, the same consists in the novel construction, combination, and arrangement of parts hereinafter more fully described, illustrated in the accompanying drawings, and pointed out in the appended claim.

In the drawings forming a part of this application, and in which like designating characters refer to corresponding parts throughout the several views:

Figure 1 is a side elevational view of an improved form of vehicle headlight employed in conjunction with the present invention, a portion of the same being broken away disclosing certain of the parts in cross section.

Figure 2 is a vertical transverse sectional view upon the line 2—2 of Figure 1, looking in the direction of the arrows.

With reference to the drawings, there is shown an improved form of vehicle headlight, two of which are employed in conjunction with the present invention. The construction of each of these headlights, is the same and therefore a description of one will suffice. These headlights are denoted in general by the letter A, and constitute a main reflector 1, having a glass lens 2 supported forwardly thereof by the usual lens retaining rim 4. The rear wall of the reflector has the usual electric bulb 5 supported centrally thereof, and secured to and spaced from the rear wall of the reflector 1, by a wooden or fiber block 6 is an annular convex plate 7 so formed at its outer edge as to provide a pair of annular shaped spaced flanges 8. The adjacent annular edge of the lens retaining rim 4 is formed in a manner similar to the adjacent edge of the annular convex plate 7 and supported between these adjacent edges of the rim 4 and plate 7 is an annular band 9 of red or other suitably colored glass 9, and supported upon the interior surface of the plate 7 is an electric bulb 10 for illuminating the rim of each of the headlights in a manner hereinafter described. If desired, the glass bands 9 in each of the headlights may have formed therein the word "Turn" for purposes apparent.

The lamp casing, as above described, is adapted to be used to provide headlights for a vehicle, and the lamp 10, in each of the headlights, are adapted to be controlled, so that the lamp, in one of the headlights, may be illuminated, for indicating a right or left turn of the vehicle, by the illumination of the annular transparent section 9, of the lamp case, at either the right or left hand side of the vehicle, in an obvious manner, which will indicate, to those in front of the machine, which way the driver of the vehicle intends to turn the same. The illumination of the lamp casing, for projecting light through the annular section 9, will act to form a kind of halo around the light projected by the parabolic reflector, in the casing.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A headlight casing comprising a transparent annulus forming the side thereof, a concaved plate closing one end of the annulus, a parabolic reflector located within the annulus and having its axis coincident with the center thereof, the smaller end of the reflector being secured to the concaved plate at the center thereof, a bulb located within the reflector and disposed at the focal point thereof, and a bulb mounted upon the concaved surface of the concaved plate and disposed at the side of the reflector and between the reflector and the edge of the concaved plate, the edge portion of the concaved plate surround the last mentioned bulb.

In testimony whereof I affix my signature.

EARL ABBOTT.